United States Patent [19]

Sone et al.

[11] Patent Number: 5,092,435
[45] Date of Patent: Mar. 3, 1992

[54] SLIP CONTROL SYSTEM FOR A VEHICLE

[75] Inventors: Akira Sone; Makoto Kawamura; Fumio Kageyama; Kazutoshi Nobumoto; Toshiaki Tsuyama, all of Hiroshima, Japan

[73] Assignee: Mazda Motor Corporation, Hiroshima, Japan

[21] Appl. No.: 543,424

[22] Filed: Jun. 26, 1990

[30] Foreign Application Priority Data

Jun. 29, 1989 [JP] Japan .................. 1-167994

[51] Int. Cl.⁵ .................. B60K 41/28; F16H 61/14
[52] U.S. Cl. .................. 192/0.032; 192/0.094;
192/3.31; 192/4 A; 180/197; 364/424.1;
364/426.03
[58] Field of Search ............... 192/0.032, 0.044, 0.055,
192/0.082, 0.09, 0.094, 3.29, 3.3, 3.31, 4 A;
180/197; 364/426.03

[56] References Cited

U.S. PATENT DOCUMENTS

| 4,503,956 | 3/1985 | Suzuki et al. | 192/3.31 |
| 4,676,353 | 6/1987 | Matsuda | 192/3.31 X |
| 4,691,812 | 9/1987 | Takizawa | 192/3.3 |
| 4,730,709 | 3/1988 | Kawata et al. | 192/3.31 |
| 4,739,856 | 4/1988 | Inagaki et al. | 180/197 |
| 4,762,196 | 8/1988 | Harada et al. | 180/197 |
| 4,825,989 | 5/1989 | Frigger | 192/4 A X |
| 4,913,270 | 4/1990 | Ishido et al. | 192/4 A |
| 4,934,497 | 6/1990 | Ishizeki et al. | 192/4 A X |
| 4,986,238 | 1/1991 | Terazawa | 180/197 X |

FOREIGN PATENT DOCUMENTS

| 57-161358 | 10/1982 | Japan | 192/0.055 |
| 58-16948 | 1/1983 | Japan | . |
| 59-73663 | 4/1984 | Japan | 192/3.31 |
| 60-56662 | 4/1985 | Japan | . |
| 60-164062 | 8/1985 | Japan | 192/3.3 |

Primary Examiner—Richard Lorence
Attorney, Agent, or Firm—Fish & Richardson

[57] ABSTRACT

A torque converter with a lockup clutch is interposed between an engine and a driven wheel, and the lockup clutch is coupled or uncoupled on the basis of a predetermined lockup characteristic. When a slip value of the driven wheel against a road surface reaches a given value or higher, torque to be applied to the driven wheel is decreased to thereby perform slip control. During this slip control, the lockup clutch is forced to be uncoupled prior to the lockup characteristic. The forcibly uncoupled state of the lockup clutch is maintained for a given period of time from the time when the slip control ends.

23 Claims, 11 Drawing Sheets

SLIP CONTROL SYSTEM FOR A VEHICLE

BACKGROUND OF THE INVENTION

1. Field of the Invention

The present invention relates to a slip control system for a vehicle and, more particularly, to a slip control system for the vehicle, adapted to prevent a slip of the driven wheels on a road surface from becoming excessive.

2. Description of Related Art

Prevention of a slip of the driven wheels from becoming excessive at the time of accelerating or the like is effective in order to efficiently provide a propulsive force of the vehicle as well as to provide safety in terms of prevention of a spin of the vehicle body and so on. In order to prevent an excessive amount of a slip of the driven wheels, torque to be applied to the driven wheels as a cause of slipping may be reduced.

Slip control of this type is disclosed, for example, in Japanese Patent Unexamined Publication (kokai) Nos. 16,948/1983 and 56,662/1985. Further, Japanese Patent Unexamined Publication (kokai) No. 231,836/1987 discloses a vehicle equipped with a torque converter having a lockup clutch interposed between an engine and a driven wheel, in which the lockup clutch is arranged so as to be forcibly uncoupled during slip control. In this technology known to the art, in instances where the lockup clutch is uncoupled during the slip control, the torque converter can reduce its efficiency of transmission of torque to the driven wheel by a portion at which the torque converter slips, and it can reduce a shock resulting from a variation in torque to be applied to the driven wheel due to its fluid buffer action, such a variation being caused by the slip control.

However, the slip control system of this type wherein the lockup clutch is uncoupled during slip control may be likely to cause the problem that a large extent of a slip may occur again immediately after the end of the slip control. In other words, if the lockup clutch is coupled in synchronization with the end of the slip control, torque to be applied to the driven wheel is temporarily increased due to no slip of the torque converter, thereby causing a large extent of a slip at the driven wheel again. This phenomenon may cause a hatching in which the startup and end of the slip control is frequently repeated as well as result in a frequent repetition of coupling and uncoupling the lockup clutch. These matters are not preferred from a viewpoint of durability.

SUMMARY OF THE INVENTION

Therefore, the present invention has the object to provide a slip control system for a vehicle which can prevent a large degree of a slip of the driven wheel from occurring again due to the uncoupling of the lockup clutch after the end of the slip control, given the fact that the lockup clutch is forcibly uncoupled during the slip control.

In order to achieve the object, the present invention consists of a slip control system of a vehicle, comprising:

a torque converter with a lockup clutch interposed between an engine and a driven wheel;

a lockup clutch control means for controlling the lockup clutch so as to be coupled or uncoupled on the basis of a predetermined lockup characteristic;

a torque adjusting means for adjusting a torque to be applied to the driven wheel;

a slip detecting means for detecting a slip value of the driven wheel against a road surface;

a slip control means for controlling a slip by reducing the torque to be applied to the driven wheel by controlling the torque adjusting means when the slip value detected by the slip detecting means is equal to or greater than a given value;

a lockup-clutch uncoupling means for uncoupling the lockup clutch prior to the predetermined lockup characteristic when slip control is performed by the slip control means; and a delay means for maintaining a state for a given period of time from end of the slip control by the slip control means, in which the lockup clutch is uncoupled by the lockup-clutch uncoupling means.

With the above arrangement, the present invention allows the lockup clutch to maintain its uncoupled state for a given period of time after the end of the slip control. Hence, even if the lockup clutch would be coupled on the basis of the lockup characteristic after the given period of time would have elapsed, the driven wheels do not cause any slip to a great extent again due to the coupling of the lockup clutch, because the slip value of the driven wheels is brought into a sufficiently low level.

As a result, the situation in which the startup and the end of the slip control should be frequently repeated can be prevented, as well as a frequent repetition of coupling and uncoupling the lockup clutch can be prevented. This is particularly preferred from a viewpoint of ensuring a sufficient degree of durability.

Other objects, features and advantages of the present invention will become apparent in the course of the description of the preferred embodiments, which follows, in conjunction with the accompanying drawings.

DETAILED DESCRIPTION OF THE PREFERRED EMBODIMENTS

The present invention will be described in more detail with reference to the accompanying drawings.

Figure 1:
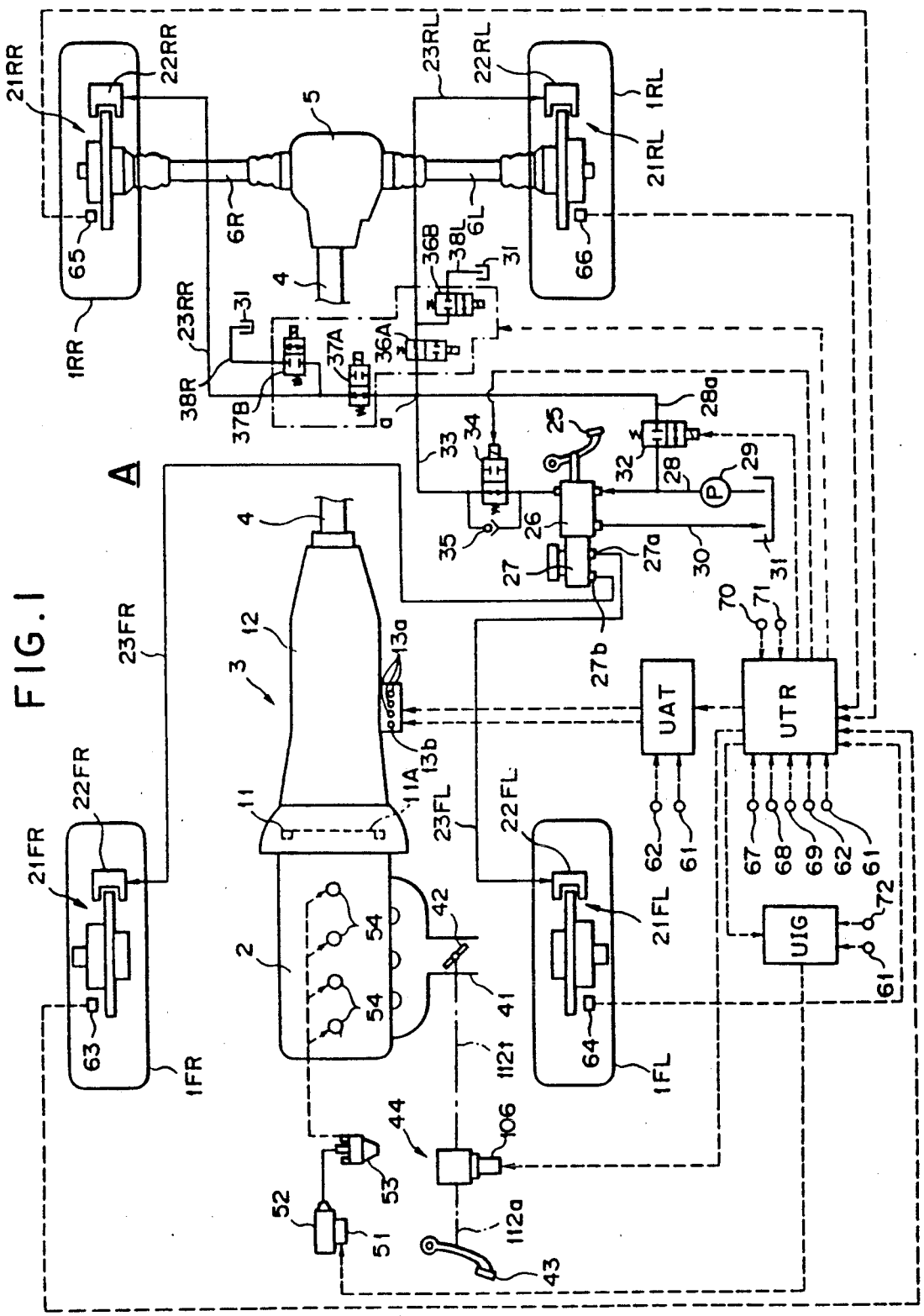
FIG. 1 is a diagrammatic representation of an outline of a system according to an embodiment of the present invention.

As shown in FIG. 1, an automobile A is shown to be of a rear wheel drive system in which a left-hand front wheel 1FL and a right-hand front wheel 1FR are undriven wheels, and a left-hand rear wheel 1RL and a right-hand rear wheel 1RR are driven. An engine 2 loaded on a front portion of the vehicle body generates torque that is then transmitted through an automatic transmission 3, a propeller shaft 4 and a differential gear 5 to a left-hand drive shaft 6L and then to the left-hand rear wheel 1RL, on the one hand, and to a right-hand drive shaft 6R and then to the right-hand rear wheel 1RR, on the other hand.

Transmission

Referring to FIG. 1, the automatic transmission 3 comprises a torque converter 11 and a multiple shift geartrain 12. The multiple shift geartrain 12 is of a hydraulically operative type as is known to those skilled in the art. In this embodiment, the geartrain has four forward speed ranges and one reverse speed range, for example, and is of the type that implements the gear shift by altering a combination of exciting and deenergizing a plurality of solenoids 13a mounted in its hydraulic pressure circuit. The torque converter 11 has a lockup clutch 11a of a hydraulically operative type and is coupled or uncoupled by altering a combination of energizing or deenergizing solenoids 13b incorporated in the hydraulic pressure circuit.

Figure 11:
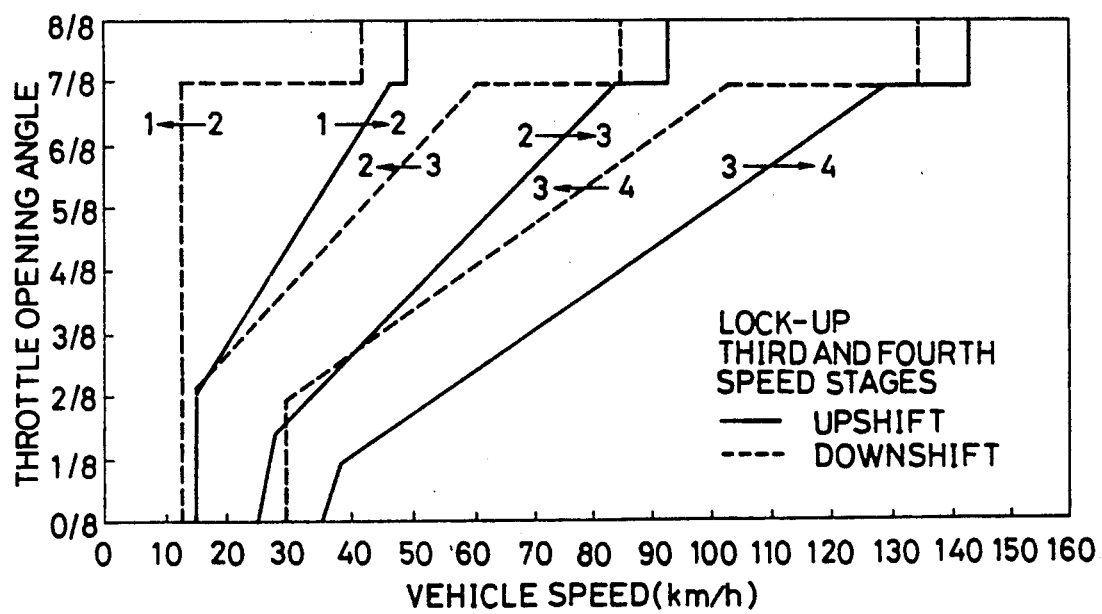
FIG. 11 is a view showing shift characteristic and lockup characteristic.
Figure 12:
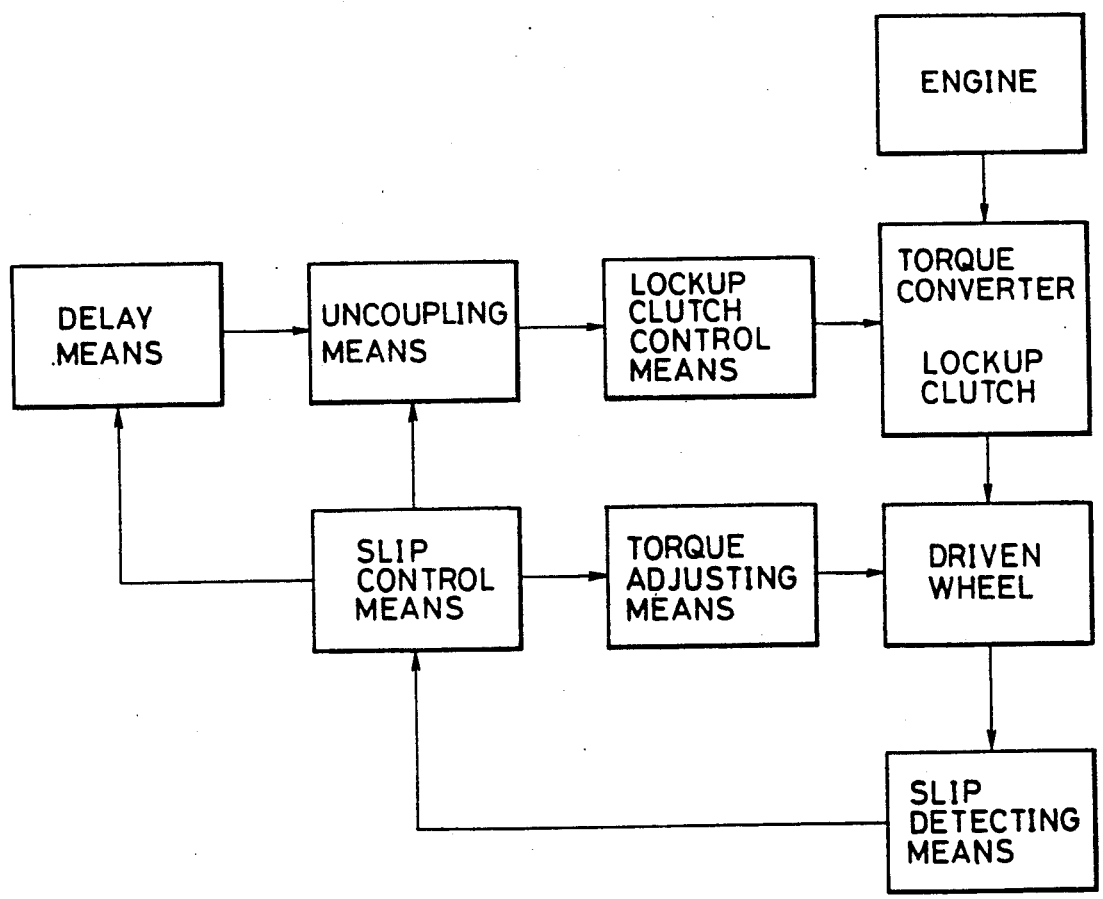
FIG. 12 is a block diagram showing an overall construction of the slip control system according to the present invention.

The solenoids 13a and 13b are controlled by a control unit UAT for automatic transmission. The control unit UAT has stored a shift characteristic as a map 89 as shown in FIG. 11, thereby performing a shift. Namely, upshifting or downshifting, on the basis of this shift characteristic. FIG. 11 also contains a lockup characteristic. In this embodiment, a lockup clutch is coupled at third and four speed stages, and the lockup clutch 11A is uncoupled at first and second speed stages.

The control unit UAT receives a signal of throttle opening angle from a sensor 61 and a vehicle speed signal from a sensor 62 (in this embodiment, a signal of the number of revolutions of a propeller shaft 4) and output from a control unit UTR for traction or slip control as will be described hereinafter.

Adjustment of Braking Liquid Pressures

As shown in FIG. 1, the front wheels 1FR, 1FL and the rear wheels 1RR, 1RL are provided with brakes 21FR, 21FL, 21RR and 21RL, respectively. The wheels 1FR, 1FL, 1RR and 1RL have calipers (wheel cylinders) 22FR, 22FL, 22RR and 22RL to which braking liquid pressure is fed through pipes 23FR, 23FL, 23RR and 23RL, respectively.

The construction for supplying the braking liquid pressure to each of the brakes 21FR, 21FL, 21RR and 21RL will be described as follows. The pressure generated by depressing a brake pedal 25 is increased by a servo unit 26 of a liquid pressure servo type and transmitted to a master cylinder 27 of a tandem type. To a first exit 27a from the master cylinder 27 is connected the braking pipe 23FL for the left-hand front wheel. To a second exit 27b of the master cylinder 27 is connected the braking pipe 23FR for the right-hand front wheel.

To the servo unit 26 is fed liquid pressure from a pump 29 through a passage 28, and a surplus of the liquid pressure is returned to a reservoir tank 31 through a passage 30. A branch passage 28a branched from the passage 28 is connected to a recombining section a, as will be described hereinafter, and a switching valve 32 of electromagnetic type is connected to the branch passage 28a. The liquid pressure generated by the servo unit 26 is fed to the recombining section a through a passage 33 which in turn is provided with a switching valve 34 of electromagnetic type. The passage 33 is further provided with a one-way restrictor 35, disposed in parallel to the switching valve 34, so as to allow only a flow toward the recombining section a.

To the recombining section a are further connected braking passages 23RR and 23RL for the right-hand and left-hand rear wheels, respectively. To the passages 23RL and 23RR are connected switching valves 36A and 37A, each of electromagnetic type, respectively, and another switching valves 36B and 37B are connected to respective relief passages 38L and 38R connected on the downstream sides of the respective valves 36A and 37A.

All the valves 32, 34, 36A, 36B, 37A and 37B are controlled by the control unit UTR for slip control. During no execution of slip control, the valve 32 is closed, the valve 34 is open, the valves 36A and 37A are open, and the valves 36B and 37B are closed, as shown in the drawing. With this arrangement, once the brake pedal is depressed, the braking liquid pressure is fed through the master cylinder 27 to the brakes 21FR and 21FL for the front wheels, while the liquid pressure from the servo unit 26 is fed as braking liquid pressure through the passage 33 to the brakes 21RR and 21RL, respectively, in accordance with the power generated by depressing the brake pedal 25.

As will be described hereinafter, when slip control is to be executed when a slip value of the rear wheels 1RR and 1RL as the driven wheels against the road surface becomes greater, the valve 34 is closed while the valve 32 is opened. The braking liquid pressure is retained, increased or decreased by duty control of the valve 36A and 36B (37A and 37B). More specifically, given the valve 32 being open, the braking liquid pressure is retained when the valves 36A, 36B, 37A and 37B are closed; it is increased when the valve 36A (37A) is open and the valve 36B (37B) is closed; and it is decreased when the valve 36A (37A) is closed while the valve 36B (37B) is open. The braking liquid pressure passed through the branch passage 28a is arranged so as not to act upon the brake pedal 25 as counterforce by means of the one-way restrictor 35.

During slip control, when the brake pedal 25 is depressed, the braking liquid pressure from the servo unit 26 is generated in accordance with the power generated by depressing the brake pedal and supplied to the brakes 21RR and 21RL for the rear wheels.

Adjustment of Torque Generated by Engine

Referring to FIG. 1, the control unit UTR for slip control or traction control brakes the driven rear wheels 1RL and 1RR and reduces the torque to be generated by the engine in order to reduce the torque applied to the driven rear wheels 1RL and 1RR. At this end, a throttle opening angle adjustment mechanism 44 is interposed within a connection mechanism of a throttle valve 42 disposed in an intake air passage 41 for the engine to an accelerator pedal 43.

The throttle opening angle adjustment mechanism 44 will be described in conjunction with FIG. 2.

Referring now to FIG. 2, the throttle opening angle adjustment mechanism 44 is shown to comprise three levers, i.e., first lever 112, second lever 113, and third lever 114, each of which is slidable in the left-hand and right-hand directions in the drawing. The first lever 112 is connected to the accelerator pedal 43 through an accelerator wire 112a and the second lever 113 is connected to the throttle valve 42 through a throttle wire 112t. The second lever 113 is arranged to be biased by a return spring 121 in the right direction in the drawing, namely, in a direction in which the throttle valve 42 is closed.

The third lever 114 comprises a first engagement section 114a engageable with the first lever 112 from the right direction in the drawing and a second engagement section 114b engageable with the second lever 113 from the right direction in the drawing. Between the first lever 112 and the third lever 114 is mounted a first spring 116 so as to bias the first engagement section 114a of the third lever 114 in a direction in which the first engagement section 114a is brought into abutment with the first lever 112. Between the second lever 113 and the third lever 114 is mounted a second spring 122 so as to bias the second engagement section 114b thereof in a direction to allow the second engagement section 114b to come into abutment with the second lever 113. The biasing force of the first spring 116 is set to be larger than the biasing force of the second spring 122 and the return spring 121.

The first lever 112 is provided with an engagement section 112b in its right position in the drawing, thereby regulating the second lever 113 from displacing in a predetermined distance toward the right direction relative to the first lever 112.

A press lever 111 is disposed on the left side of the third lever 114 in the drawing, which is driven in the left and right directions in the drawing by means of a motor 106 and whose left direction beyond a predetermined distance is yet blocked by a stopper 123 which is arranged so as to abut with the press lever 111.

The action of the throttle opening angle adjustment mechanism 44 will now be described hereinafter.

Figure 2A:
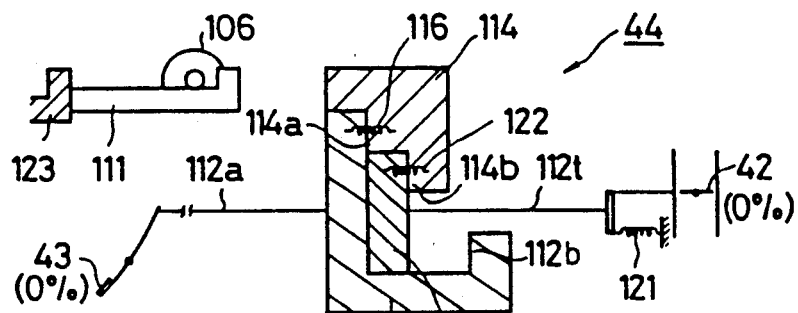
FIGS. 2(a) to 2(d) are diagrammatic representations showing an operation manner, of a drive mechanism of the throttle valve.
Figure 2B:
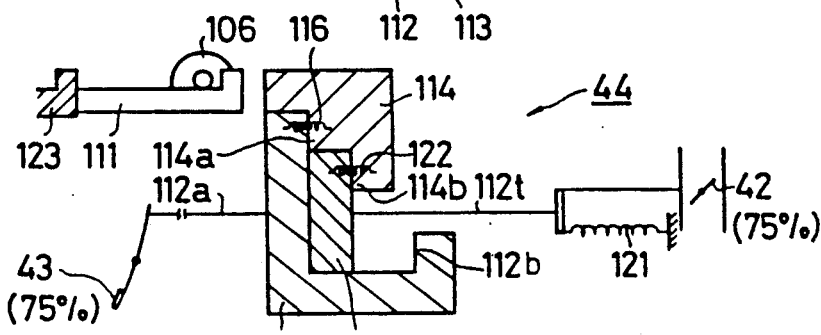

First, when the press lever 111 is in abutment with the stopper 123, no exterior force is applied to the third lever 114 so that the first lever 112 is in such a state that the first lever 112 is always integral with the second lever 113 and the third lever 114, as shown in FIGS. 2(a) and 2(b), thus providing a throttle opening angle in accordance with an accelerator opening angle. In other words, the throttle valve is opened at opening angles ranging from 0% to 100% as the accelerator opening angle ranges from 0% to 100%. FIG. 2(a) represents the throttle opening angle of 0% while the accelerator opening angle is 0%. FIG. 2(b) represents the throttle opening angle of 75% in accordance of a 75% accelerator opening angle. As shown in FIG. 2(b), there is provided a clearance between the press lever 111 and the third lever 14, a clearance being set so as to vary from 0% to 100% with respect to the entire length of the clearance in accordance with the corresponding accelerator opening angle varying from 0% to 100%. In other words, for example, when the throttle opening angle is 75%, as shown in FIG. 2(b), the clearance accordingly is shortened by 75%—in other words, there is still remained a clearance accounting for 75% to 100% with the entire length therebetween. This can be said of whichever opening angle is. Further, it is to be noted that, when the throttle opening angle reaches 100%, namely, when the accelerator opening angle reaches 100%, there is no clearance between the press lever 111 and the third lever 114 in other words, the press lever 111 being in slight abutment with the third lever 114.

Figure 2C:
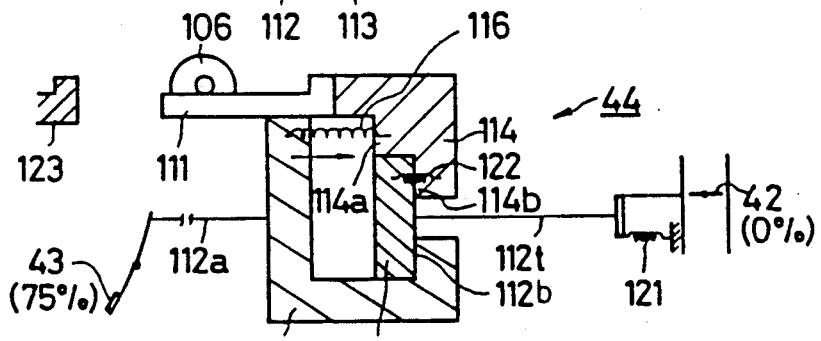

When the motor 106 is then operated to drive the press lever 111 from the state as shown in FIG. 2(b) toward the right in the drawing, the third lever 114 is forced to move to the right in resistance to the first spring 116 as shown in FIG. 2(c). This causes the throttle opening angle to be returned in the direction of closure even if the accelerator opening angle is the same. FIG. 2(c) represents the state in which the throttle opening angle is returned to a full closed state when the accelerator opening angle is 75%. In this case, the engagement section 112b is brought into abutment with the second lever 113.

Figure 2D:
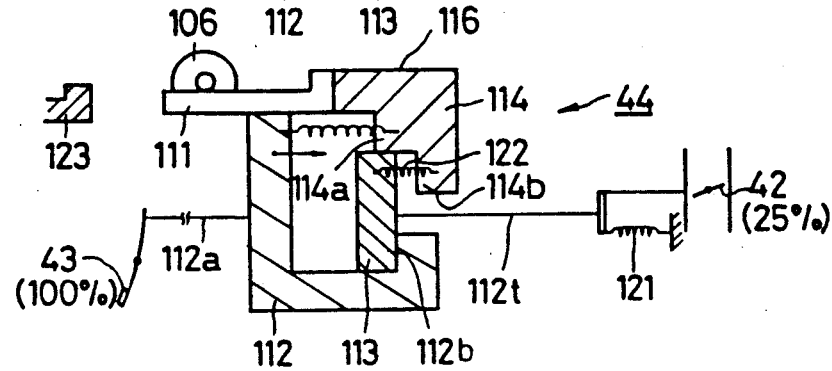

When the accelerator opening angle is forced to account for 100% as shown in FIG. 2(d) from the state as shown in FIG. 2(c), then the first lever 112 is forced to move toward the left in the drawing while the engagement section 112b is forced to move the second lever 113 toward the left, too, in accompany with the leftward movement of the first lever 112. This changes the state as shown in FIG. 2(c) in which the throttle opening angle is 0% to the state as shown in FIG. 2(d) in which the throttle opening angle is 25%.

In this embodiment, the full opening operation of the accelerator pedal can allow the throttle valve 42 to be opened at least to 25%. Thus, even if the press lever 111 would have been stuck in the state as shown in FIG. 2(C), the automobile could be driven by itself at the least to a tune-up factory or any other appropriate locations nearby.

As will be apparent from the foregoing description, the spring 122 is no longer necessary. It is also noted that the lever 113 constituting the second lever and the lever 114 may be integrally constructed together with each other (in this case, however, they cannot take the status as shown in FIG. 2(d)).

Outline of Slip Control

In performing slip control, the control unit UTR for slip control implements brake control, engine control to be implemented by controlling the motor 106 for the throttle opening angle adjustment mechanism 44, and lockup control through a control unit UAT for shift control. The control unit UTR is provided with inputs of signals from the sensors 63, 64, 65 and 66 for sensing each of the wheel speeds, a signal of the throttle opening angle from a sensor 61, a signal of a vehicle speed from a sensor 62, a signal of the accelerator opening angle from the sensor 67, a signal of an opening angle for the motor 106 from a sensor 68, a signal of a steered angle of the steering wheel from a sensor 69, a mode signal from a from a brake switch 71 so as to be turned on when the brake pedal is depressed.

Figure 3:
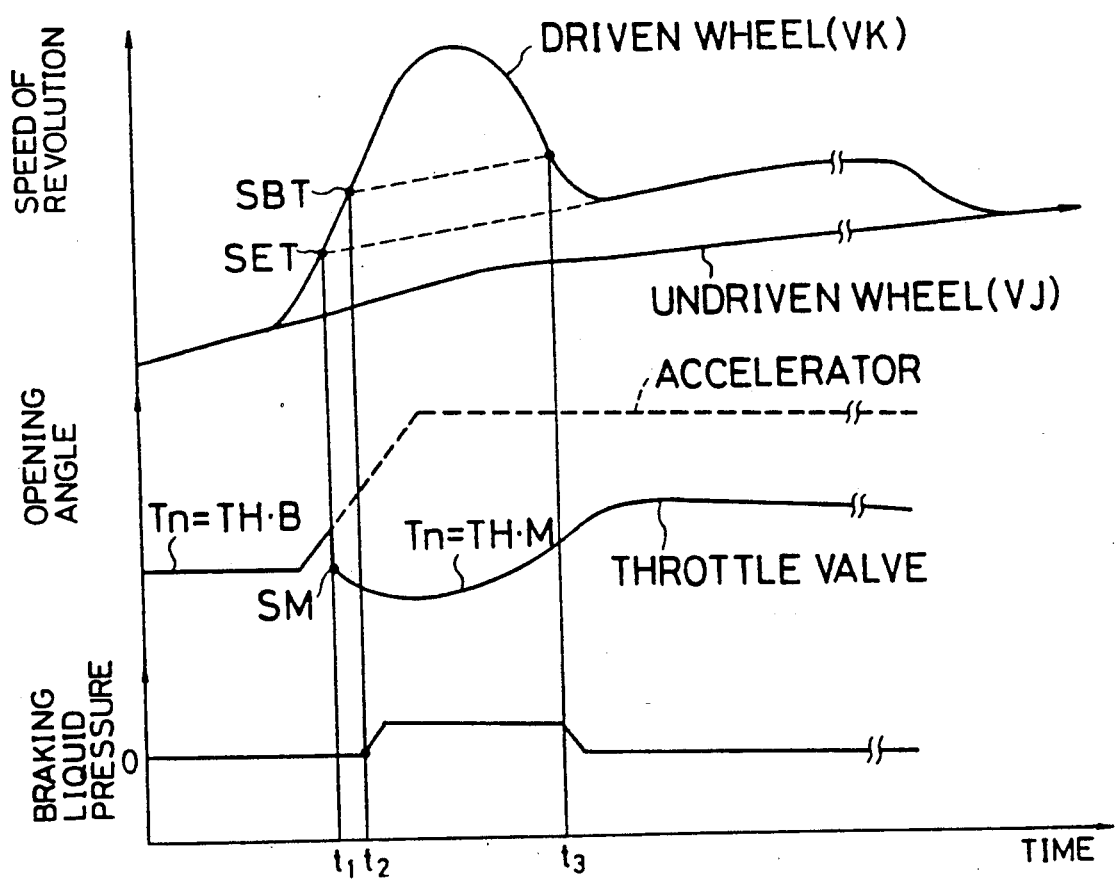
FIG. 3 is a time chart showing an outline of slip control.

FIG. 3 indicates the contents of the slip control with a focus on the engine control and the brake control. In FIG. 3, a target value for engine (a target slip value of the driven wheel) is represented by SET, while a target value for brake is represented by SBT (SBT>SET).

Figure 9:
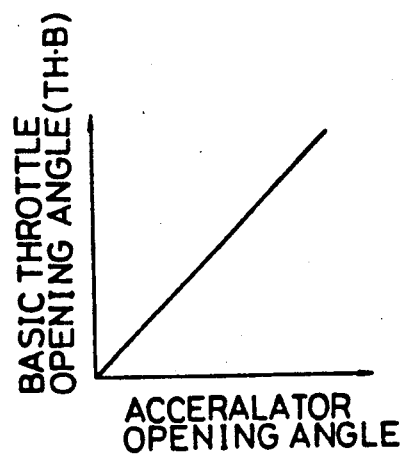
FIG. 9 is a view showing a basic throttle characteristic.

As the driven wheels cause no slipping to a large extent prior to the time point t1, the throttle opening angle corresponds to the accelerator opening angle. In other words, the throttle opening angle is represented by a basic throttle opening angle TH·B obtainable on the basis of the basic throttle characteristic as shown in FIG. 9.

At the time pint t1, a slip occurs to such a large extent that a slip value of the driven wheel becomes the target value SET or higher. In this embodiment, slip control is started when the slip value of the driven wheel becomes the target value SET or higher. At this time point t1, the throttle opening angle is immediately reduced down to the lowest control value SM (feed-forward control). Once it is lowered to the lowest control value SM, the opening angle of the throttle valve is subjected to feedback control so as to allow the slip value of the driven wheel to become the target value SET for engine. In this case, the target throttle opening angle is indicated by TH·M (the opening angle of the motor 106=an amount of operation) (TH·M≦TH·B).

At the time point t2 when the slip value of the driven wheel reaches the target value SBT for brake or higher, the braking liquid pressure is supplied to the brakes 21RR and 21RL of the driven wheels (so as to start up slip control by both the engine control and brake control). In this case, the braking liquid pressure is subjected to feedback control so as for the slip value of the driven wheel to reach the target value SBT for brake.

At the time point t3 when the slip value of the driven wheel becomes smaller than the target value SBT for brake, the braking liquid pressure is gradually decreased and eventually to zero. The slip control by the engine is still continued.

In this embodiment, the condition in which the slip control is suspended is when the accelerator is closed to a full extent.

Detail of Slip Control

Detail of the slip control by the control unit UTR will be described hereinafter with reference to the flow charts.

Figure 4:
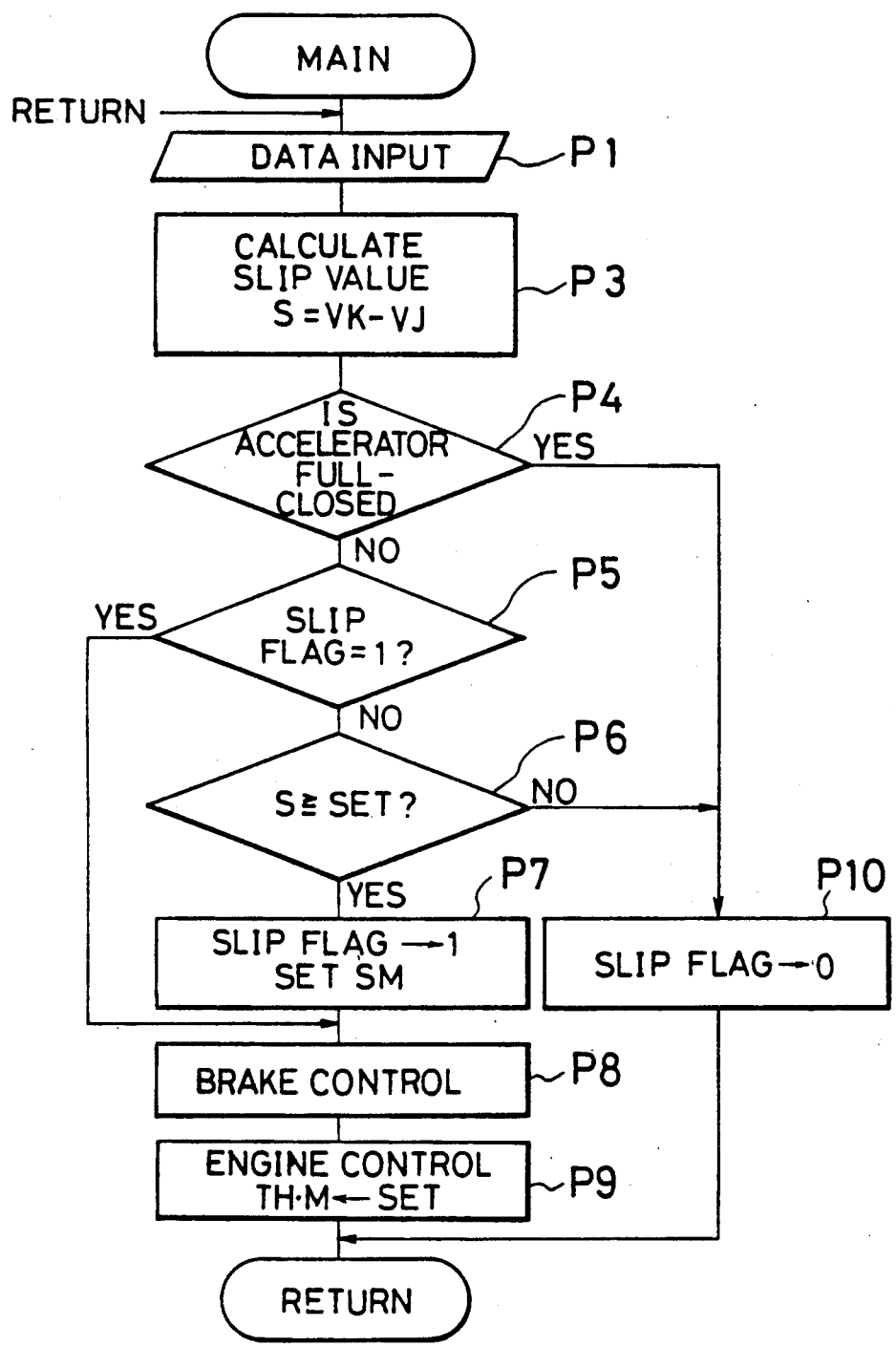
FIGS. 4 to 6 and 10 are flow charts showing control examples according to the present invention.

Main Routine (FIG. 4)

First, at step P1, signals from the sensors and switches are read.

At step P3, an actual slip value S for the driven wheel is calculated by subtracting a revolution speed VJ of the undriven wheel from a revolution speed VK of the driven wheel. In calculating this actual slip value S, for instance, the revolution speed VJ of the undriven wheel for the engine is used as an average of the revolution speeds of the left-hand and right-hand undriven wheels and the revolution speed VK of the driven wheel for the engine is used as a revolution speed of the left-hand driven wheel or the right-hand driven wheel, whichever larger, while the revolution speed VJ of the undriven wheel for the brake is the same as that for the engine and the revolution speed VK of the driven wheel for the brake is selected from individual revolution speeds of the left-hand and right-hand driven wheels, respectively (in this case, the braking power to the left-hand and right-hand driven wheels is controlled individually and independently).

At step P4, it is decided whether the accelerator is currently in a full closed state. If the decision at step P4 is NO, it is then decided at step P5 whether slip flag is set to 1. That the slip flag is set to 1 means that slip control is under way. If the decision at step P5 is NO, the flow proceeds to step P6 where it is further decided whether a slip value S for the driven wheel is equal to or greater than the target value SET for engine. If the decision is YES at step P6, the flow advances to step P7 where the slip flag is set to 1 and the lowest control value SM is set. After step P7, the flow proceeds to step P8. When the decision at step P5 is YES, the flow proceeds to step P8 without passage through steps P6 and P7.

At step P8, brake control is performed as will be described hereinafter. The content of the brake control is to decide and realize the target value SBT for brake.

After step P8, the flow advances to step P9 where the target value SET for engine is decided in a manner as will be described hereinafter, and a throttle opening angle (an opening angle of the motor 106) TH·M to be required for realization of this target value SET for engine is decided on the basis of a given formula for feedback control. The realization of the target value SET for engine, i.e., output of the throttle opening angle TH·M, is performed by interruption processing for throttle control as will be described hereinafter.

When the decision at step P4 is YES, slip control is suspended by resetting the slip flag to zero at step P10.

Figure 5:
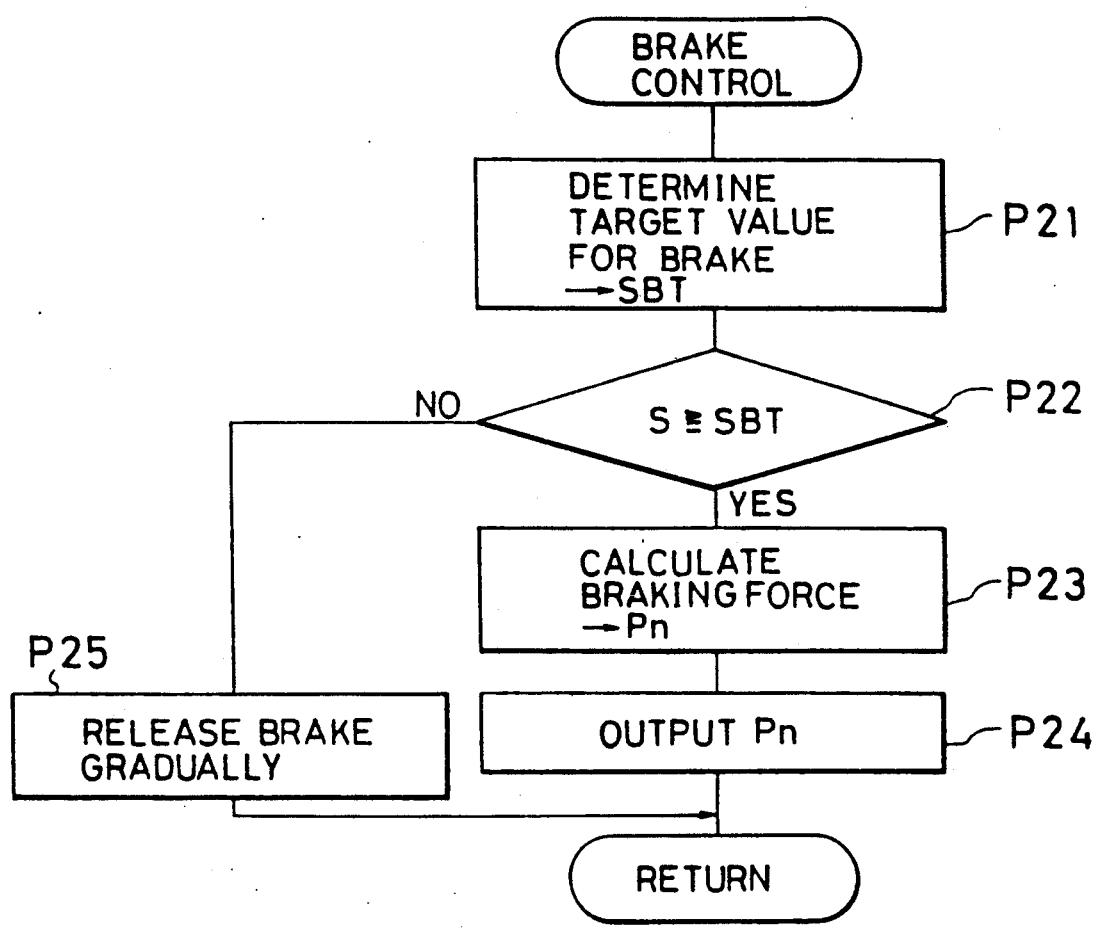

FIG. 5 (Step PB of FIG. 4)

In FIG. 5 showing the content of brake control, the target value SBT for brake is first decided at step P21 and it is then judged at step P22 whether the slip value S for the driven wheel is greater than the target value SBT for brake. If the decision at step P22 is YES, on the one hand, a braking power Pn (an amount of operating the valves 36A and 36B or the valves 37A and 37B=duty ratio) necessary to make the slip value S reach the target value SBT is decided at step P23. Then at step P24, the signal corresponding to the decided braking power Pn is generated to the above valves. If the decision at step P22 is NO, on the other hand, the braking liquid pressure is gradually decreased at step P25. (In some case, the braking liquid pressure may be decreased to zero.)

Figure 6:
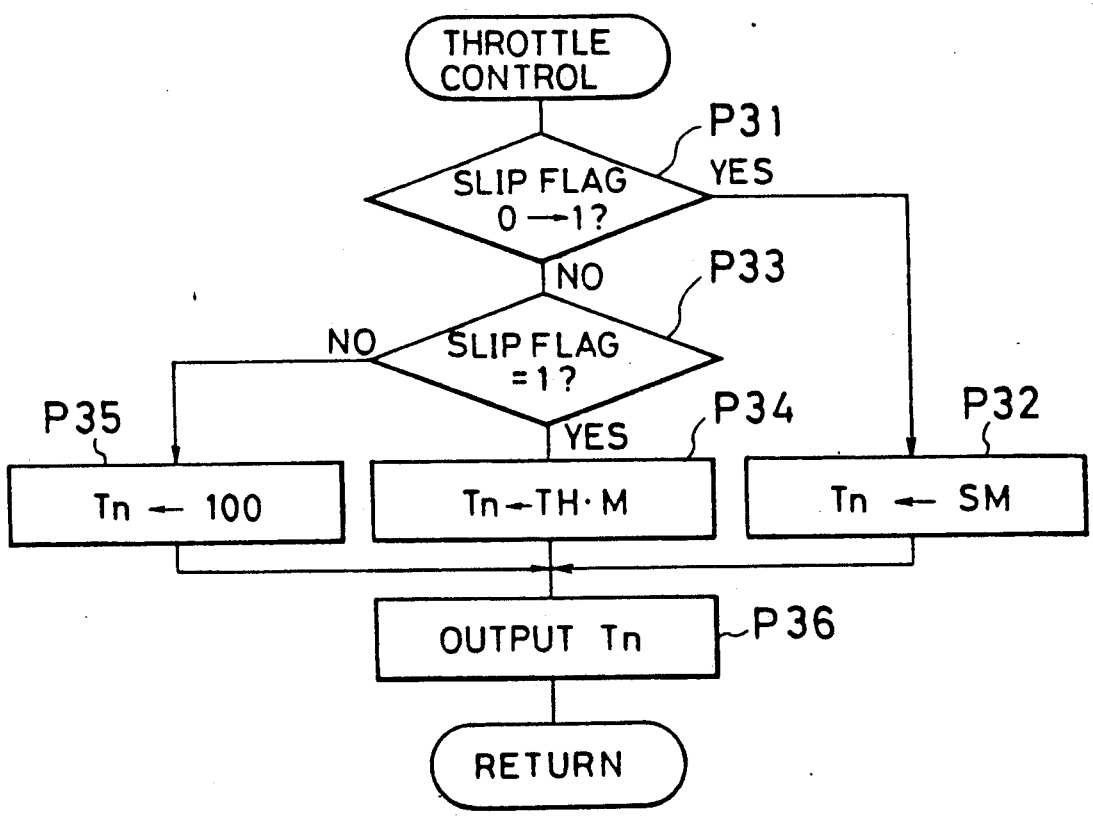

FIG. 6 (Step P9 of FIG. 4)

The process of FIG. 6 is executed by interruption into the flow chart of FIG. 4 at each predetermined time and it is to control the driving of the throttle valve. At step P31, it is decided whether it is the time when the slip flag has changed from zero to one, namely, it is the time t1 of FIG. 3. If the decision at step P31 is YES, on the one hand, the flow proceeds to step P32 where the final target throttle opening angle Tn (the motor opening angle) is set as the lowest control value SM to be decided as will be described hereinafter.

If it is decided at step P31 that it is not the time when the slip flag has changed to one from zero, on the other hand, it is then decided at step P33 whether or not the slip flag is 1. If the decision at step P33 is YES, the flow proceeds to step P34 and the final target throttle opening angle Tn is set as the throttle opening angle TH·M to be decided at step P9 of FIG. 4.

If the decision at step P33 is NO, this means that no slip control is performed so that the final target throttle opening angle Tn is set to 100 (the characteristic depending upon the accelerator opening angle, as shown in FIG. 9, is provided).

After steps P32, P34 or P35, the motor 106 is driven so as to generate the final target throttle opening

Target Values SET & SBT for Slip Control And Lowest Control Value SM

Description will be made of an example of determining the target value SET for engine and the target value SBT for brake as well as the lowest control value SM (at the time point t1 in FIG. 1), in performing slip control.

Figure 7:
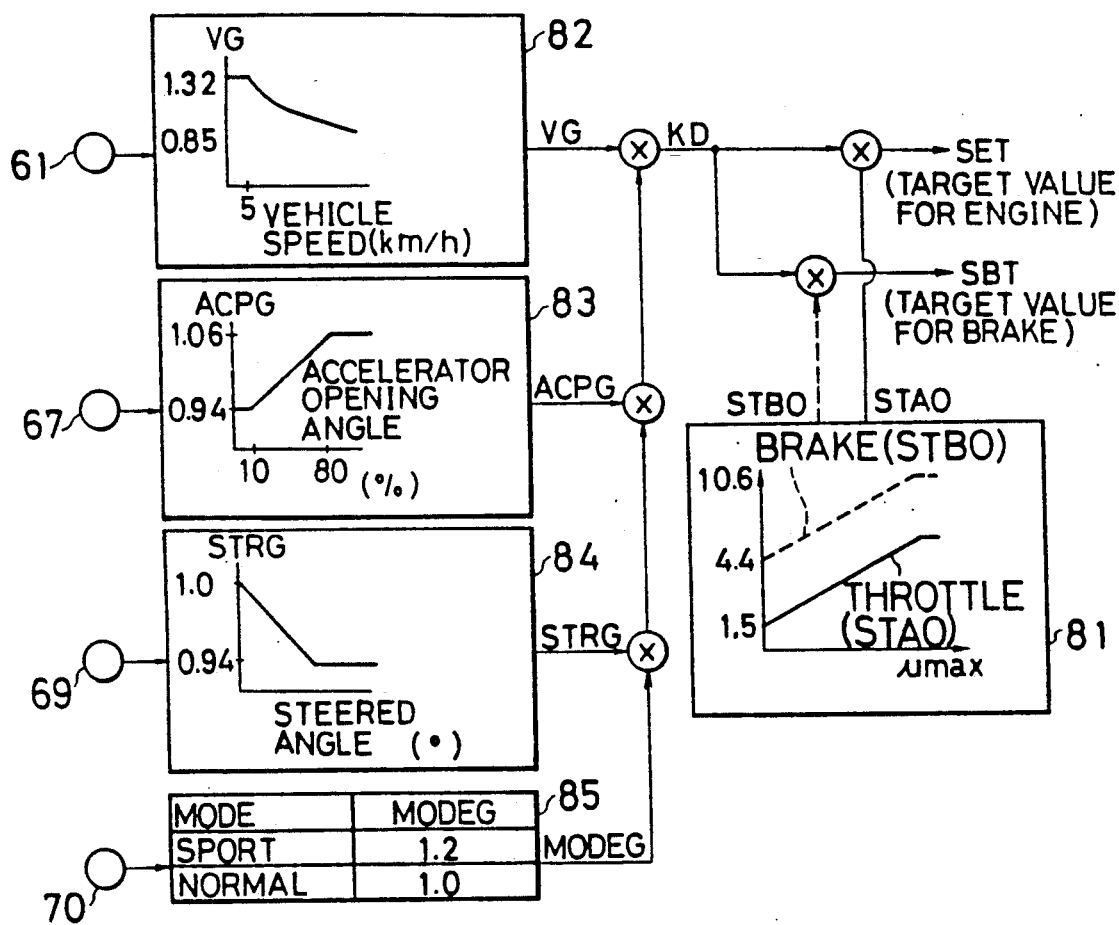
FIG. 7 is a circuit view for determining each of slip control values for engine and for brake.

FIG. 7 shows the block diagram illustrating the circuit for determining the target values SET and SBT for engine and for brake, respectively, in which the vehicle speed, the accelerator opening angle, the steered angle of a steering wheel, an operational status of the mode switch 70, and the maximum friction coefficient, μmax, against the road surface are used as parameters. In FIG. 7, the basic value STAO of the target value SET for engine and the basic value STBO of the target value SBT for brake are stored in a map 81 using the maximum friction coefficient as a parameter (STAO<STBO). It is thus to be noted that the target values SET and SBT are obtained by multiplying the basic values STAO and STBO, respectively, by a correction gain coefficient KD.

The correction gain coefficient KD is obtained by multiplying each of gain coefficients VG, ACPG, STRG and MODEG. The gain coefficient VG is determined by using the vehicle speed as a parameter and is stored as a map 82. The gain coefficient ACPG is determined by using the accelerator opening angle as a parameter and is stored as a map 83. The gain coefficient STRG is determined by using the steered angle of the steering wheel as a parameter and is stored as a map 84. The gain coefficient MODEG is selected manually by the operator and stored as a table 85 in which two modes comprised of sport mode and normal mode are set.

Figure 8:
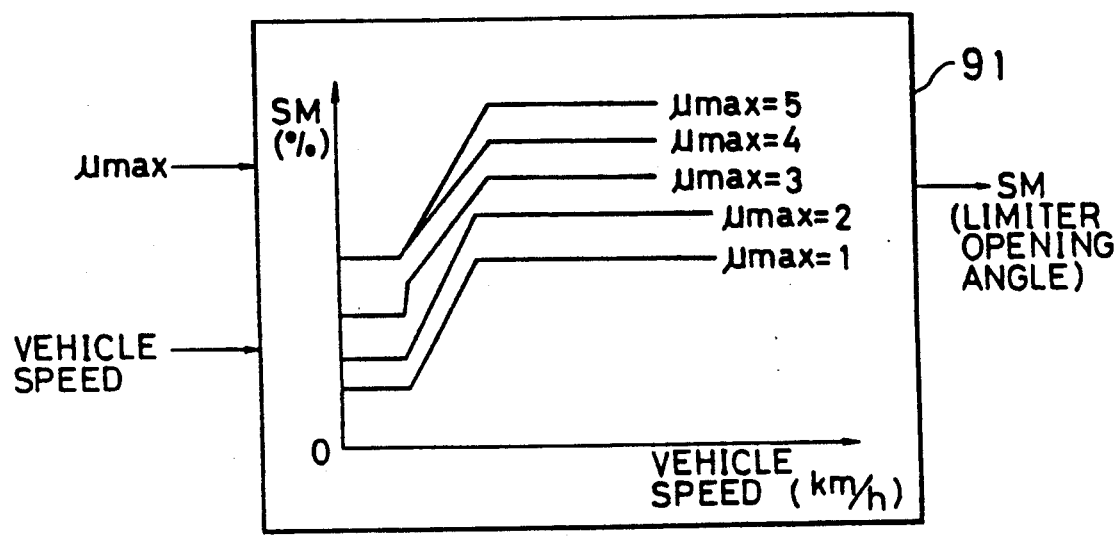
FIG. 8 is a map for determining the lowest control value in slip control.

The lowest control value SM is determined by using the vehicle speed and the maximum friction coefficient against the road surface as parameters and stored as a map 91, as shown in FIG. 8. In FIG. 8, $\mu$max=1 means that the friction coefficient is the lowest while $\mu$max=5 means that the friction coefficient is the greatest. This can be said so in the map 81 of FIG. 7.

It is to be noted that, although the maximum friction coefficient against the road surface may manually be set by the operator, it may be estimated as follows. In other words, the maximum friction coefficient can be estimated in accordance with the magnitude of acceleration obtainable by subtracting the revolution speed of the undriven wheel after a predetermined time period elapsed from the time point t1 of FIG. 3 from the revolution speed of the undriven wheel at the time point t1. Further, it can be estimated on the basis of the maximum acceleration among the magnitudes of acceleration monitored on the basis of a variation in the revolution speed over the entire time period of the latest slip control.

Control of Transmission

Figure 10:
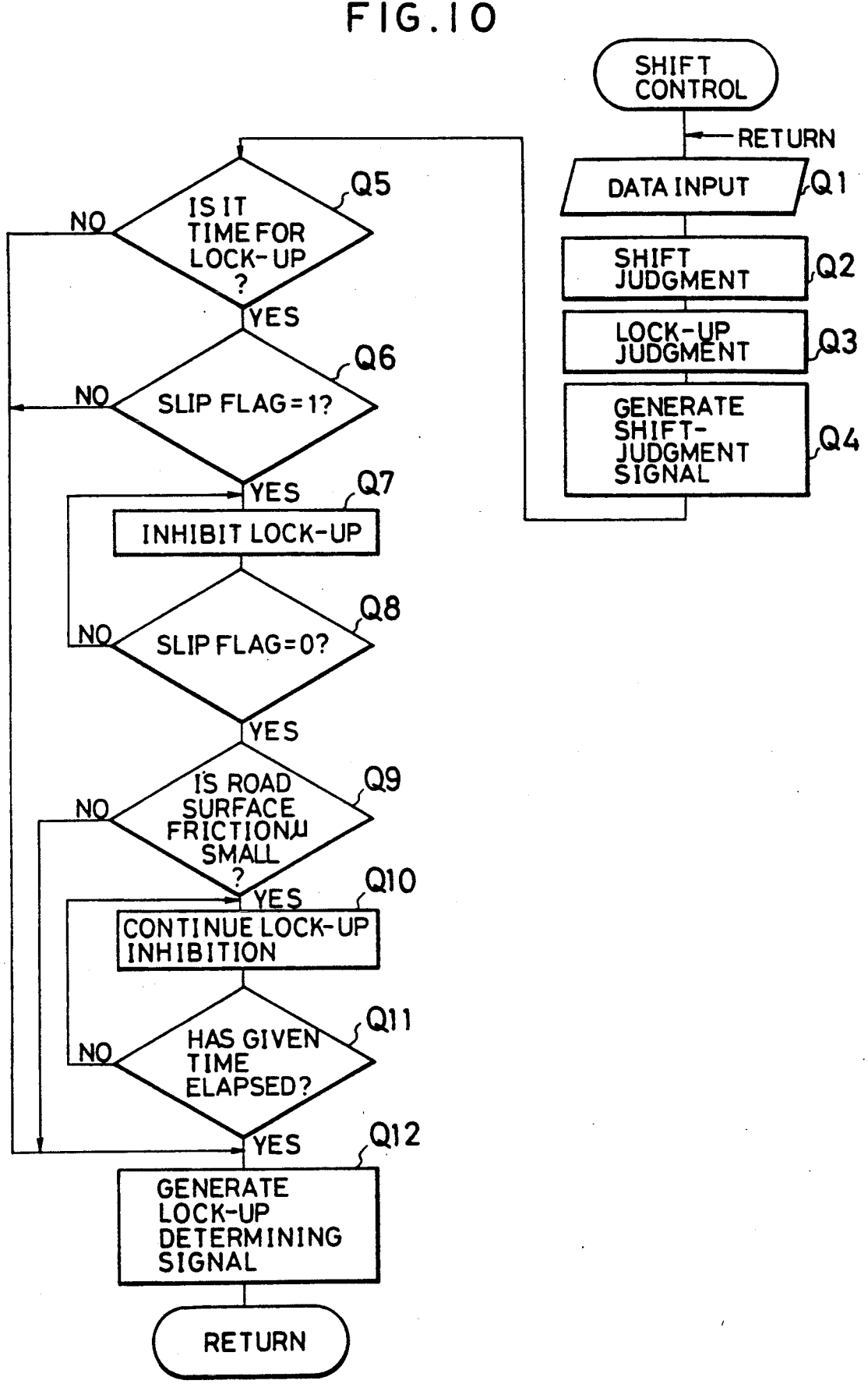

The control content of the control unit UAT for the transmission is shown in FIG. 10.

First at step Q1, the vehicle speed and the throttle opening angle are read and, then at step Q2, a shift judgment is performed whether to upshift or downshift on the basis of the shift characteristic as shown in FIG. 11. Further, at step Q3, a lockup judgment is performed whether or not to couple or uncouple the lockup clutch 11A on the basis of the lockup characteristics as shown in FIG. 11, which can be used as the shift characteristic, too. At step Q4, a shift judgment signal is generated to the solenoid 13a on the basis of the result from the shift judgment at step Q2.

Then at step Q5, it is decided whether the result from the lockup judgment at step Q3 indicates the coupling of the lockup clutch 11A. If the decision as step Q5 is YES, it is further judged at step Q6 whether or not slip flag is set to 1. When it is decided at step Q6 that the slip flag is set to 1, i.e., that the slip control is under way, it is inhibited at step Q7 that the lockup clutch 11A is coupled, prior to the judgment result at step Q3. In other words, the lockup clutch 11A is uncoupled at step Q7. Thereafter at step Q8, it is decided whether the slip flag is zero. When the decision at step Q8 is NO, it is decided that the slip control is still under way so that the flow proceeds to step Q7.

When it is decided at step Q8 that the slip flag is set to zero, the flow proceeds to step Q9 and it is decided therein whether or not the friction coefficient on a road surface (a maximum friction coefficient μmax may also be utilized) is small. If the decision at step Q9 is YES, the inhibition of coupling the lockup clutch 11A is continued at step Q10. Then at step Q11, it is confirmed that a given period of time has elapsed since the time point when the slip flag has been turned to zero and, at step Q12, the coupling or uncoupling of the lockup clutch 11A is implemented according to the result of the lockup judgment at step Q3.

If the decision at step Q5, Q6 or Q9, the flow proceeds to step Q12.

In the embodiment as described hereinabove, given the fact that the friction coefficient is small enough when the slip control has ended, the coupling of the lockup clutch 11A is inhibited for a given period of time. This is because the fact is taken into account that there is a very small possibility that a large extent of a slip occurs at the driven wheels again when the friction coefficient μ is large, even if the lockup clutch 11A would be coupled immediately after the end of the slip control.

It is also to be noted that the given period of time may be set at step Q12 so as to vary with the friction coefficient μ on a road surface. In other words, the given period of time may be set shorter when the friction coefficient μ is great, while is given period of time may be set longer when the friction coefficient μ is small. Furthermore, the setting of the given time period may be made in a stepwise manner or in a continuous manner.

Control of Spark Timing

A control unit UIG is provided for controlling the spark timing of the engine. The control unit UIG is basically constructed so as to determine the spark timing on the basis of the signal of the throttle opening angle from the sensor 61 and the signal of the number of revolutions of the engine from the sensor 72. The spark timing decided is generated to an igniter 51 and the primary current of an ignition coil 52 is blocked at this spark timing. The secondary current of a high voltage generated by blocking the primary current is fed to a spark plug 54 through a distributer 53.

It is also possible to temporarily retard the spark timing to a great extent by generating from the control unit UTR to the control unit UIG a signal indicating the time when slip control should start, in place of or in combination with a temporary decrease of the throttle opening angle down to the lowest control value SM.

In the embodiments as described hereinabove, the slip value of the driven wheel is represented by a variation between the revolution speeds of the undriven and driven wheels, however, the slip value may be represented by a ratio of the former to the latter. It is also to be noted that the slip control may be carried out by means of engine control only or brake control only.

It is to be understood that the foregoing text and drawings relate to embodiments of the invention given by way of examples but not limitation. Various other embodiments and variants are possible within the spirit and scope of the present invention.

What is claimed is:

1. A slip control system of a vehicle, comprising:
a torque converter with a lockup clutch interposed between an engine and a driven wheel;
a lockup clutch control means for controlling the lockup clutch so as to be coupled or uncoupled on the basis of a predetermined lockup characteristic;
a torque adjusting means for adjusting a torque to be applied to the driven wheel;
a slip detecting means for detecting a slip value of the driven wheel against a road surface;
a slip control means for controlling a slip by reducing the torque to be applied to the driven wheel by controlling the torque adjusting means when the slip value detected by the slip detecting means is equal to or greater than a given value;
a lockup-clutch uncoupling means for uncoupling the lockup clutch prior to the predetermined lockup characteristic when slip control is performed by the slip control means; and
a delay means for maintaining a state for a given period of time from end of the slip control by the slip control means, in which the lockup clutch is uncoupled by the lockup-clutch uncoupling means.

2. A slip control system as claimed in claim 1, wherein the lockup characteristic is set by using a load of the engine and a vehicle speed as parameters.

3. A slip control system as claimed in claim 1, further comprising an altering means for altering a condition for executing a delay in accordance with a friction coefficient on the road surface so as to allow operation of the delay means to be made or to be inhibited.

4. A slip control system as claimed in claim 3, wherein the altering means inhibits operation of the delay means when the friction coefficient on the road surface is larger than a given value and the altering means allows operation of the delay means when the friction coefficient on the road surface is smaller than the given value.

5. A slip control system as claimed in claim 1, wherein a second torque adjusting means is provided for adjusting a torque to be generated by the engine as the torque adjusting means; and
the torque to be generated by the engine decreased by controlling the second torque adjusting means during slip control.

6. A slip control system as claimed in claim 5, wherein the slip control means subjects the second torque adjusting means to feedback control so as for the slip value detected by the slip detecting means to reach a given target value.

7. A slip control system as claimed in claim 6, wherein the slip control means subjects the second torque adjusting means to feed-forward control by a given control value prior to the feedback control at the time when the slip control starts.

8. A slip control system as claimed in claim 6, wherein the slip control starts by the slip control means when the slip value detected by the slip detecting means is equal to or higher than the target value.

9. A slip control system as claimed in claim 5, wherein the second torque adjusting means is a load adjusting means for adjusting a load of the engine.

10. A slip control system as claimed in claim 9, wherein the engine is of an Otto type in which the load is adjusted by adjusting an amount of intake air; and
the load adjusting means is a throttle valve for adjusting the amount of intake air.

11. A slip control system as claimed in claim 1, wherein the torque adjusting means is a brake disposed to the driven wheel; and
the slip control means is to apply a braking force to the driven wheel by controlling the brake.

12. A slip control system as claimed in claim 11, wherein the slip control means subjects the brake to feeddback control so as for the slip value detected by the slip detecting means to reach a given target value.

13. A slip control system as claimed in claim 1, wherein:
the torque adjusting means comprises a second torque adjusting means for adjusting a torque to be generated by the engine and a brake to be disposed to the driven wheel; and
the slip control means comprises a first slip control means for subjecting the second torque adjusting means so as for the slip value detected by the slip detecting means to reach a first given target value and a second slip control means for subjecting the brake to feedback control so as for the slip value detected by the slip detected means to reach a second given target value.

14. A slip control system as claimed in claim 13, wherein the first given target value is set as a value which is different from the second given target value.

15. A slip control system as claimed in claim 14, wherein the first given target value is set as a value which is smaller than the second given target value.

16. A slip control system as claimed in claim 13, wherein the lockup characteristic is set by using a load of the engine and a vehicle speed as parameters.

17. A slip control system as claimed in claim 13, further comprising an altering means for altering a condition for executing delay in accordance with a
a friction coefficient on the road surface so as to allow operation of the delay means to be made or to be inhibited.

18. A slip control system as claimed in claim 13, wherein the altering means inhibits operation of the delay means when the friction coefficient on the road surface is larger than a given value and the altering means allows operation of the delay means when the friction coefficient on the road surface is smaller than the given value.

19. A slip control system as claimed in claim 13, further comprising a third slip control means for subjecting the second torque adjusting means to feed-forward control by a given control value prior to slip control by the first slip control means at the time when slip control starts.

20. A slip control system as claimed in claim 13, wherein the second torque adjusting means is a load adjusting means for adjusting a load of the engine.

21. A slip control system as claimed in claim 20, wherein the engine is of an Otto type in which the load is adjusted by adjusting an amount of intake air; and
the load adjusting means is a throttle valve for adjusting the amount of intake air.

22. A slip control system as claimed in claim 1, wherein either one of a front wheel or a rear wheel is a driven wheel and the other is an undriven wheel; and
the slip detecting means calculates the slip value on the basis of a speed of revolution of the driven wheel and a speed of revolution of the undriven wheel.

23. A slip control system as claimed in claim 13, wherein either one of a front wheel or a rear wheel is a driven wheel and the other is an undriven wheel; and
the slip detecting means calculates the slip value on the basis of a speed of revolution of the driven wheel and a speed of revolution of the undriven wheel.

* * * * *